United States Patent
Lin et al.

(10) Patent No.: US 6,809,922 B2
(45) Date of Patent: Oct. 26, 2004

(54) EXPANSION CARD MOUNTING APPARATUS

(75) Inventors: Kuo-Chih Lin, Tu-Chen (TW); DaLong Sun, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/346,753

(22) Filed: Jan. 16, 2003

(65) Prior Publication Data

US 2004/0125550 A1 Jul. 1, 2004

(30) Foreign Application Priority Data

Dec. 27, 2002 (TW) ........................................ 91221272 U

(51) Int. Cl.⁷ ................................................. G06F 1/16
(52) U.S. Cl. ........................ 361/683; 361/736; 361/752
(58) Field of Search ................................. 361/726–737, 361/752, 759, 784–785, 800–801, 809–810, 716, 818, 825, 683, 788

(56) References Cited

U.S. PATENT DOCUMENTS 6,231,139 B1 * 5/2001 Chen ........................ 312/223.2

* cited by examiner

Primary Examiner—Yean-Hsi Chang
(74) Attorney, Agent, or Firm—Wei Te Chung

(57) ABSTRACT

An expansion card mounting apparatus includes a rear panel (20) defining an opening (21), a retaining bracket (10) slidably attached to the panel and including a main body (12) and a pressing body (16), and a fastening member (30) fixed to the retaining bracket. A support plate (22) extends rearwardly from the panel adjacent the opening. A through opening (120) is defined in the main body. Cutouts (162) are defined in the pressing body. The fastening member includes a plurality of pressing clips (35) extending through the cutouts to abut end portions (52) of slot covers (50), and an operation lever (33) extending through the through opening of the retaining bracket to resiliently engage with the panel at the opening. Thus the end portions of the slot covers are securely sandwiched between the pressing body and the support plate.

21 Claims, 5 Drawing Sheets

EXPANSION CARD MOUNTING APPARATUS

BACKGROUND OF THE INVENTION

1. Field of the Invention

The present invention relates to mounting apparatuses, and more particularly to a mounting apparatus for readily and securely mounting expansion cards in a computer enclosure.

2. Related Art

Many computer systems comprise not only a motherboard, but also one or more expansion cards that provide specialized functions. Such expansion cards each typically comprise a rectangular printed circuit board (PCB), and a metallic slot cover attached at an end edge of the PCB. The slot cover has an outwardly bent end portion. When an expansion card is installed in a computer enclosure, the end portion abuts a support plate formed at a rear panel of the enclosure. A cutout defined in the end portion coincides with a hole defined in the support plate. A screw or a bolt is extended through the cutout and engaged in the hole. The slot cover is thus secured to the support plate.

When installing or removing several expansion cards, using fasteners such as screws or bolts is laborious and time-consuming. In addition, a tool such as a screwdriver or a wrench is usually required. It is desired to eliminate said fasteners, by instead providing other retaining means to hold the expansion cards in place.

SUMMARY OF THE INVENTION

Accordingly, an object of the present invention is to provide an apparatus for easy and quick installation and removal of expansion cards to and from equipment such as a computer enclosure.

To achieve the above-mentioned object, an expansion card mounting apparatus in accordance with a preferred embodiment of the present invention comprises a rear panel, a retaining bracket and a fastening member. The rear panel defines an opening in one side portion thereof. A support plate extends rearwardly from the rear panel adjacent the opening, to support end portions of slot covers of expansion cards. A pair of latch slots is defined in the rear panel near the opening. The retaining bracket comprises a main body having a pair of latches slidably engaging in the latch slots of the rear panel, and a pressing body extending perpendicularly from one edge of the main body. A through opening and a plurality of positioning holes are defined in the main body. A plurality of cutouts is defined in the pressing body. The fastening member comprises a plurality of positioning pins engaging in the positioning holes respectively, a plurality of pressing clips extending through the cutouts to abut the end portions of the slot covers, and an operation lever extending through the through opening of the retaining bracket to resiliently engage with the rear panel at the opening. Thus the end portions of the slot covers are securely sandwiched between the pressing body and the support plate.

Other objects, advantages and novel features of the present invention will be drawn from the following detailed description of the preferred embodiment of the present invention with attached drawings, in which:

DESCRIPTION OF THE PREFERRED EMBODIMENT

The present invention will be described in its preferred embodiment, and in conjunction with a plurality of expansion cards.

Figure 1:
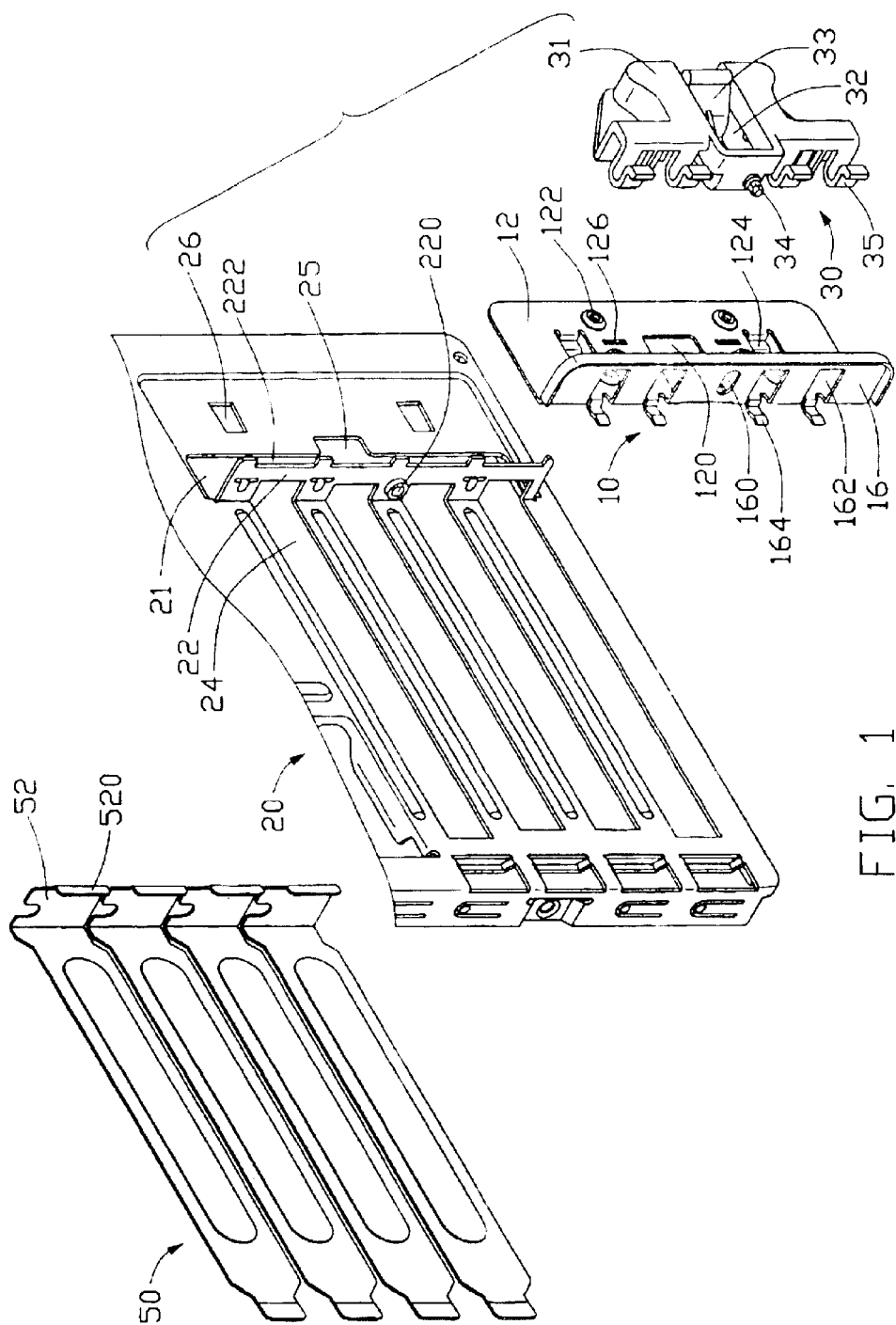
FIG. 1 is an exploded, isometric view of an expansion card mounting apparatus in accordance with the preferred embodiment of the present invention, together with a plurality of slot covers of expansion cards, the expansion card mounting apparatus comprising a rear panel, a retaining bracket and a fastening member.
Figure 2:
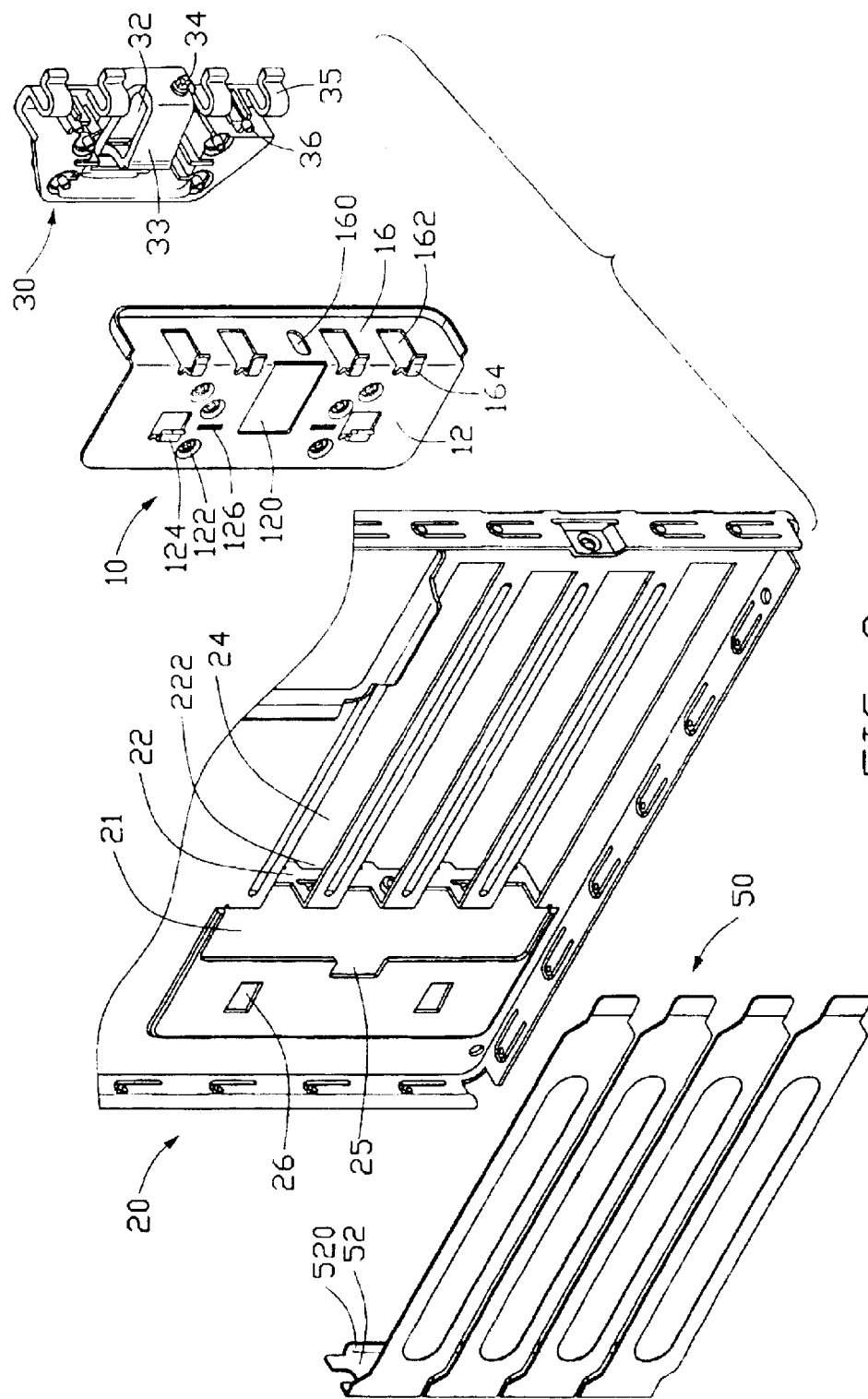
FIG. 2 is similar to FIG. 1, but viewed from another aspect.

FIGS. 1 and 2 show an expansion card mounting apparatus in accordance with the preferred embodiment of the present invention, together with a plurality of slot covers 50 of expansion cards (not shown). The mounting apparatus comprises a rear panel 20, a retaining bracket 10, and a fastening member 30 for fastening the slot covers 50 to the rear panel 20.

Each slot cover 50 comprises a perpendicularly bent end portion 52. A distal edge of the end portion 52 is perpendicularly bent to form a tab 520.

The rear panel 20 defines a rectangular opening 21 in one side portion thereof. A vertical support plate 22 extends perpendicularly rearwardly from the rear panel 20 adjacent the opening 21. The support plate 22 is for supporting the end portions 52 of the slot covers 50. A fastening hole 220 is defined in a middle portion of the support plate 22. A plurality of indentations 222 is defined in the support plate 22 at a distal edge thereof. The indentations 222 are for engagingly receiving the tabs 520 of the slot covers 50 respectively. A plurality of evenly spaced horizontal expansion slots 24 is defined in the rear panel 20, each in communication with a same side of the opening 21. The expansion slots 24 can receive the slot covers 50 threat respectively. A pair of vertically spaced latch slots 26 is defined in a recessed part of the rear panel 20 that is adjacent an opposite side of the opening 21. A gap 25 is defined in a middle portion of the recessed part of the rear panel 20, in communication with said opposite side of the opening 21.

The retaining bracket 10 comprises a main body 12, and a pressing body 16 extending perpendicularly rearwardly from one longitudinal edge of the main body 12. A through opening 120 is defined in a middle portion of the main body 12 adjacent the pressing body 16. A plurality of positioning holes 122 is symmetrically defined in the main body 12 generally above and below the through opening 120 so that the positioning holes 122 generally surround the through opening 120. A pair of vertically spaced apertures 126 is defined in a middle portion of the main body 12, respectively near corners of the through opening 120. A pair of latches 124 is forwardly stamped from top and bottom portions of the main body 12 respectively. The latches 124 have predetermined lengths, and are for slidingly engaging in the latch slots 26 of the rear panel 20 so as to movably latch the retaining bracket 10 on the rear panel 20. A mounting hole 160 is defined in a middle portion of the pressing body 16, corresponding to the fastening hole 220 of the rear panel 20. A plurality of cutouts 162 is defined in top and bottom portions of the pressing body 16, generally above and below the mounting hole 160. A plurality of spring fingers 164 extends from a proximal edge portion of the main body 12, at front extremities of the cutouts 162 respectively.

Figure 3:
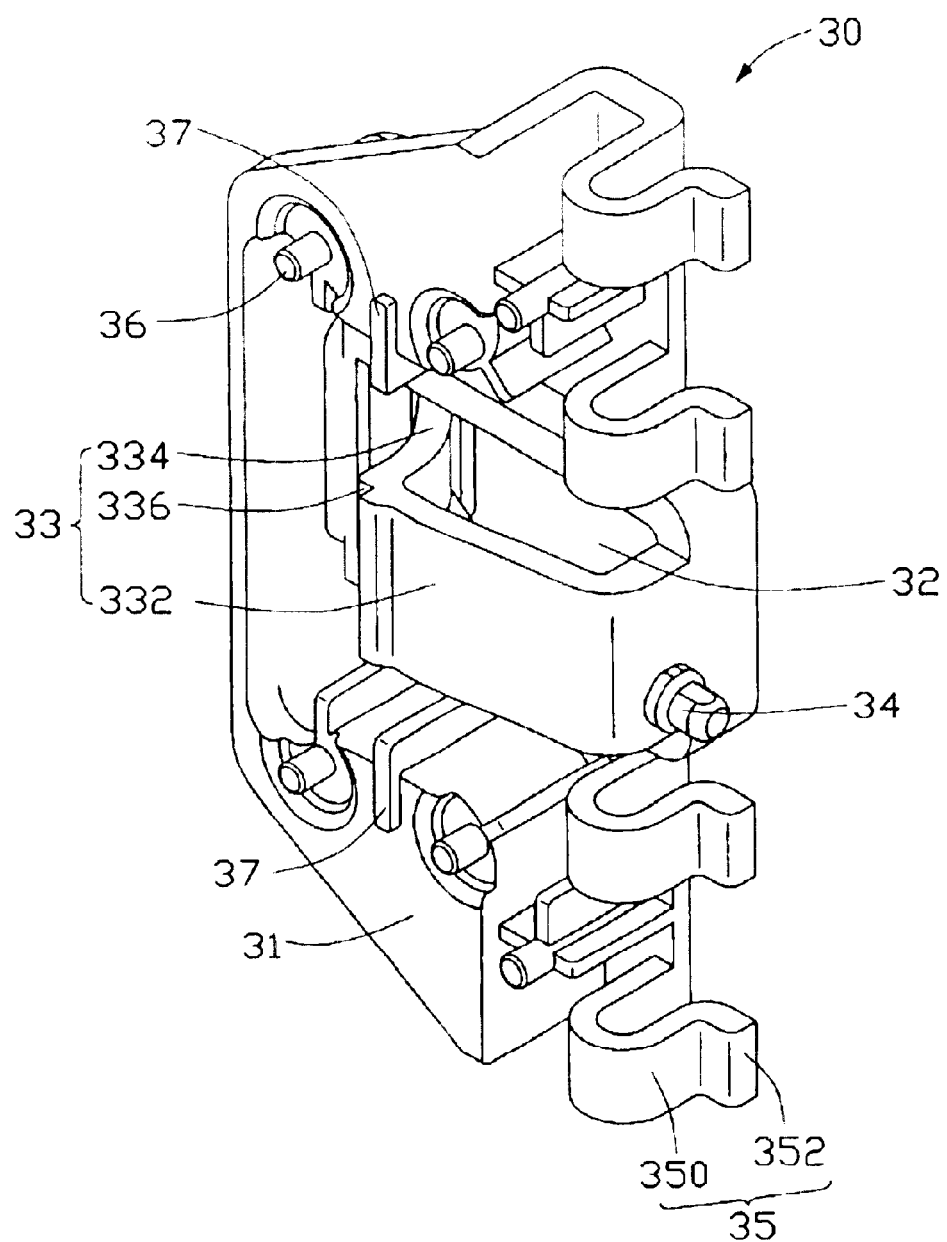
FIG. 3 is an enlarged view of the fastening member of the expansion card mounting apparatus of FIG. 2.

Referring also to FIG. 3, the fastening member 30 is made of resilient material such as plastic, and comprises a base frame 31. A cavity 32 is defined in a middle portion of the base frame 31. An operation lever 33 extends from the base frame 31 into the cavity 32. The operation lever 33 comprises a stem 332 extending rearwardly from a side of the base frame 31 at the cavity 32, and a handle 334 extending from a distal end of the stem 332 through the cavity 32. A detent step 336 is formed at a junction of the stem 332 and the handle 334. A fastening pin 34 is outwardly formed from a proximal portion of the stem 332, corresponding to the mounting hole 160 of the retaining bracket 10 and the fastening hole 220 of the rear panel 20. A plurality of pressing clips 35 is formed along a longitudinal side of the base frame 31, corresponding to the cutouts 162 of the retaining bracket 10. Each pressing clip 35 comprises a generally U-shaped main portion 350 extending from the base frame 31, and a pressing portion 352 extending from a free end of the main portion 350. A plurality of positioning pins 36 extends forwardly from the base frame 31 at top and bottom sides of the cavity 32, for engaging in the positioning holes 122 of the retaining bracket 10 respectively. A pair of spaced protrusions 37 is forwardly formed from the base frame 31 adjacent top and bottom sides of the cavity 32, for engaging in the apertures 126 of the retaining bracket 10.

Figure 4:
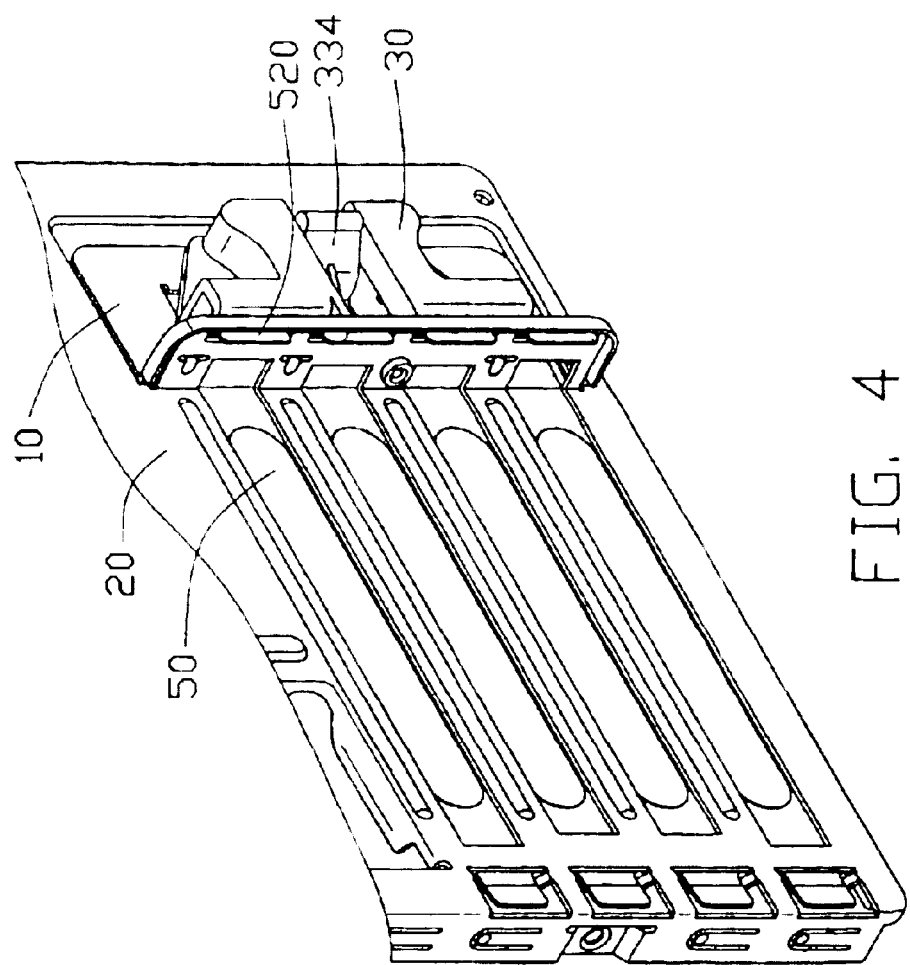
FIG. 4 is an assembled view of FIG. 1.
Figure 5:
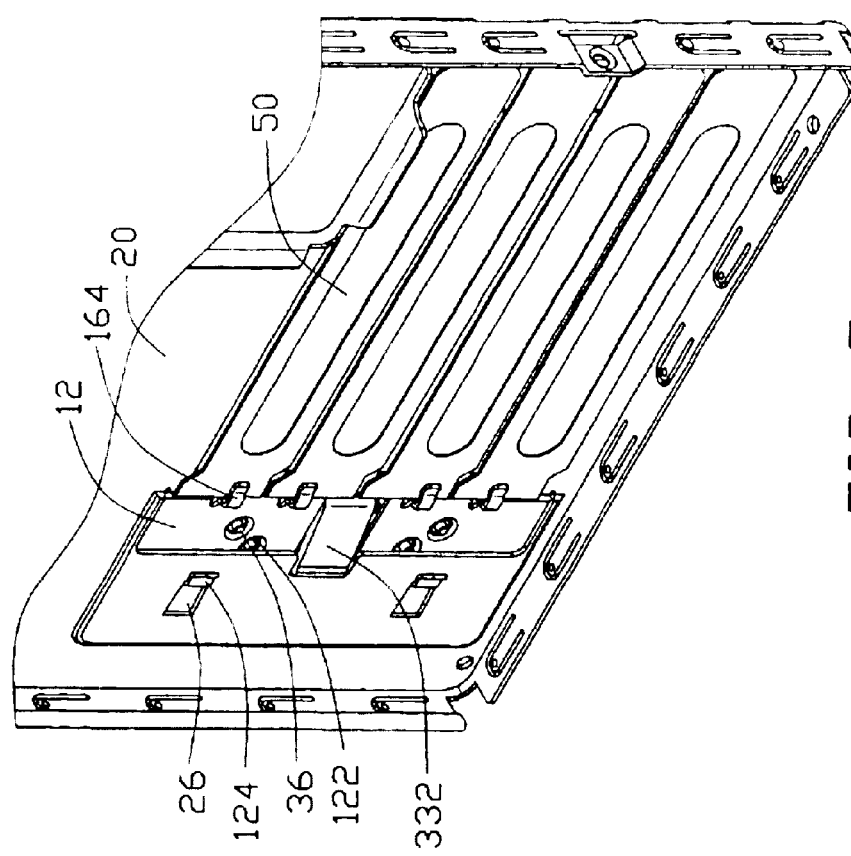
FIG. 5 is similar to FIG. 4, but viewed from another aspect.

Referring also to FIGS. 4 and 5, in assembly, the retaining bracket 10 is placed to cover the opening 21 of the rear panel 20. The latches 124 of the main body 16 of the retaining bracket 10 are slidingly engaged in the latch slots 26 of the rear panel 20. Because of the predetermined lengths of the latches 124, the retaining bracket 10 can be slid relative to the rear panel 20 in horizontal directions without being disengaged from the rear panel 20.

The fastening member 30 is placed against the retaining bracket 10. The fastening pin 34 is extended into the mounting hole 160 of the pressing body 16. The positioning pins 36 are extended through the positioning holes 122 of the main body 16. The protrusions 37 are engagingly received in the apertures 126 of the main body 16. The stem 332 of the operation lever 33 is extended through the through opening 160 of the main body 16. The pressing portions 352 of the pressing clips 35 are extended through the cutouts 162 of the pressing body 16.

The handle 334 is pushed so that the retaining bracket 10 slides slightly away from the support plate 22 of the rear panel 20. A space is created between the support plate 22 and the pressing body 16 of the retaining bracket 10. The expansion cards are attached to a motherboard (not shown). The slot covers 50 of the expansion cards are received at the expansion slots 24 of the rear panel 20, and the end portions 52 of the slot covers 50 are positioned in the space between the support plate 22 and the pressing body 12. The tabs 520 of the end portions 52 are engaged in the indentations 222 of the support plate 22. The handle 334 is pushed, so that the retaining bracket 10 slides toward the support plate 22, and the fastening pin 34 extends into the fastening hole 220 of the support plate 22. The pressing body 16 and the pressing portions 352 of the pressing clips 35 are driven to abut against the end portions 52 of the slot covers 50 respectively. The handle 334 is further pushed in a same direction and forwardly until the stem 332 deformably extends into the opening 21 of the rear panel 20. The pressing body 16 and the pressing portions 352 are thus driven to firmly press the end portions 52 of the slot covers 50 against the support plate 22 of the rear panel 20. A peripheral flange (not labeled) of the pressing body 16 retains the tabs 520 in the indentations 222. The spring fingers 164 resiliently press against ends of the slot covers 50 at the end portions 52 respectively. The handle 334 is released so that the detent step 336 of the operation lever 33 is resiliently engaged with the rear panel 20 at the gap 25. The fastening member 30 is thus resiliently engaged between the rear panel 20 at the gap 25 and the end portions 52 of the slot covers 50. Thus the end portions 52 are securely sandwiched between the pressing body 16 and the support plate 22.

To remove the expansion cards, the handle 334 is pulled rearwardly and away from the rear panel 20 so that the detent step 336 is released from the rear panel 20 at the gap 25. The handle 334 is then pulled so that the retaining bracket 10 slides away from the support plate 22. The spring fingers 164 are released from the ends of the slot covers 50 at the end portions 52 respectively. The pressing clips 35 are disengaged from the end portions 52. The peripheral flange of the pressing body 16 is released from the support plate 22. The tabs 520 are then released from the indentations 222, and the slot covers 50 of the expansion cards are removed from the expansion slots 24 of the rear panel 20. Simultaneously, the expansion cards are removed from the motherboard.

In the mounting apparatus of the present invention, the slot covers 50 of the expansion cards are received at the expansion slots 24 of the rear panel 20. The end portions 52 of the slot covers 50 are retained between the support plate 22 of the rear panel 20 and the pressing clips 35 of the fastening member 30 by resilient force of the stem 332 of the operation lever 36 of the fastening member 30. Thus, the slot covers 50 are securely attached to the rear panel 20. Accordingly, the expansion cards are reliably mounted to the motherboard of the computer.

In addition, the retaining bracket 10 is slidably attached to the rear panel 20, and the fastening member 30 is detachably attached to the retaining bracket 10. When removing or installing any one or more of the expansion cards, it is not necessary to significantly remove the retaining bracket 10 or the fastening member 30. This allows quick and convenient removal and installation of the expansion cards.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A mounting apparatus for expansion cards, each of the expansion cards comprising a slot cover having an outwardly bent end portion, the mounting apparatus comprising:

a panel defining an opening, and a plurality of expansion slots for receiving the slot covers, the panel comprising a support member arranged adjacent the opening and adapted for supporting the end portions of the slot covers;

a retaining bracket slidably attached to the panel, the retaining bracket comprising a main body covering the opening of the panel, and a pressing body extending from one edge of the main body, the pressing body defining a plurality of cutouts therein; and a fastening member detachably fixed to the retaining bracket, the fastening member comprising a plurality of pressing members extending through the cutouts to abut against the end, portions of the slot covers, and a resilient member having a detent means extending through the opening to resiliently abut against the panel at the opening, whereby the pressing members and the pressing body are pressed toward the support member by said resilient member so that the pressing members and the pressing body securely sandwich the end portions of the slot covers with die support member.

2. The mounting apparatus as described in claim 1, wherein the panel further defines a pair of latch slots, and the main body of the retaining bracket comprises a pair of latches slidably engaging in the latch slots.

3. The mounting apparatus as described in claim 1, wherein the fastening member further comprises a base frame defining a cavity in a middle portion thereof, and the resilient member comprises an operation lever having a stem extending from a side of the base frame at the cavity, and a handle extending from a distal end of the stern and through the cavity.

4. The mounting apparatus as described in claim 3, wherein the panel further defines a gap in communication with one side of the opening, and the detent means comprises a step formed at a junction of the stem and the handle, the step resiliently engaging with the panel at the gap.

5. The mounting apparatus as described in claim 3, wherein, the fastening member further comprises a pair of protrusions adjacent the cavity, and the main body of the retaining bracket defines a pair of apertures engagingly receiving the protrusions.

6. The mounting apparatus as described in claim 3, wherein each of the pressing members comprises a generally U-shaped main portion extending from the base frame, and a pressing portion extending from one end of the U-shaped main portion and pressingly abutting a corresponding end portion.

7. The mounting apparatus as described in claim 1, wherein each of the pressing body and the support member defines a hole therein, and the fastening member further comprises a fastening pin extending from the base frame into the holes of the pressing body and the support member.

8. The mounting apparatus as described in claim 1, wherein a plurality of spring fingers, extends from a proximal edge portion of the main body at extremities of the cutouts respectively, and the spring fingers resiliently press against ends of the slot covers at the end portions respectively.

9. A mounting apparatus assembly comprising:
a panel defining an opening extending along a lengthwise direction and through said panel in a front-to-back direction perpendicular to said lengthwise direction;
a plurality of expansion slots defined in the panel adjacent the support member for receiving slot covers of the expansion cards;
a retaining bracket slidably attached to the panel and located at outer side, of the panel, the retaining bracket comprising a pressing body abutting the support member; and
a fastening member detachably fixed to the retaining bracket, the fastening member comprising a plurality of pressing members and an operation body;
wherein by operation of said operation body, the combined retaining bracket and fastening member can be slid between a first position where said operation body engages with the panel to urge the pressing members and the pressing body toward the support member thereby retaining end portions of the slot covers on the support member, and a second position where said operation body is disengaged from the panel thereby releasing the end portions of the slot, covers from the support member.

10. The mounting apparatus as described in claim 9, wherein the retaining bracket further comprises a main body covering the opening of the panel, and the pressing body extends from one edge of the main body.

11. The mounting apparatus as described in claim 9, wherein the pressing body defines a plurality of cutouts therein, and the pressing members respectively extend through the cutouts to abut against the end portions of the slot covers.

12. The mounting apparatus as described in claim 10, wherein the panel defines a pair of latch slots near the opening, and the main body comprises a pair of latches slidably engaging in the latch slots.

13. The mounting apparatus as described in claim 10, wherein the main body defines a plurality of positioning holes, and the fastening member comprises a plurality of positioning pins engaging in the positioning holes.

14. The mounting apparatus as described in claim 10, wherein the fastening member defines a cavity, and said operation body comprises a stem extending from a side of the fastening member at the cavity, and a handle extending from a distal end of the stem and through the cavity.

15. The mounting apparatus as described in claim 14, wherein the panel further defines a gap in communication with one side of the opening, the main body defines a through opening, and said operation body forms a detent means at a junction of the stem and the handle, said detent means extending through the through opening to abut against the panel at the gap.

16. The mounting apparatus as described,ed in claim 11, wherein a plurality of spring fingers extends from a proximal edge portion of the main body at extremities of the cutouts respectively, and the spring fingers resiliently press against ends of the slot covers at the end portions respectively.

17. The mounting apparatus as described in claim 9, wherein a hole is defined in each of the support member and the pressing body, and the fastening member further comprises a fastening pin extending through the holes.

18. The mounting apparatus as described in claim 9, wherein the support member further defines a plurality of indentations, and the end portions of slot covers engage in the indentations.

19. A mounting apparatus for expansion cards, comprising:
a panel defining an opening with a support member perpendicularly extending from an lengthwise edge of the opening;
a support member outwardly stamped from said panel and extending from an lengthwise edge of said opening;
a plurality of expansions slots extending in said panel along a transverse direction perpendicular to both said lengthwise direction and said front-to-back direction, said expansion slots extending through said panel in said front-to-back direction;
a plurality of slot covers each including an elongated main body covering the corresponding expansion slot, and an end portion seated upon the support member;
a retaining bracket attached to the panel along the transverse direction, and thus retained from movement along said lengthwise direction and said front-to-back direction; and
a fastening member associated with said retaining bracket and including an operation lever releaseably attached to the panel; wherein said fastening member further includes a plurality of pressing clips each abutting against the end portion of the corresponding slot cover in the transverse direction.

20. The assembly as described in claim 19, wherein said retaining bracket further includes a plurality of stamped spring fingers respectively abutting against the corresponding slot covers in the front-to-back direction.

21. The assembly as described in claim 20, wherein said retaining bracket defines a plurality of cutouts derived from the corresponding stamped spring fingers, respectively, and said cutouts receive the corresponding pressing clips therein respectively.

* * * * *